United States Patent
Trogolo et al.

(10) Patent No.: US 6,248,342 B1
(45) Date of Patent: Jun. 19, 2001

(54) ANTIBIOTIC HIGH-PRESSURE LAMINATES

(75) Inventors: Jeffrey A. Trogolo, Boston, MA (US); John E. Barry, Derry, NH (US)

(73) Assignee: AgION Technologies, LLC, Wakefield, MA (US)

( * ) Notice: Subject to any disclaimer, the term of this patent is extended or adjusted under 35 U.S.C. 154(b) by 0 days.

(21) Appl. No.: 09/163,039

(22) Filed: Sep. 29, 1998

(51) Int. Cl.[7] ............ A61K 9/00; A01N 25/34; B32B 9/04; B32B 15/04; B32B 15/08; B32B 27/10

(52) U.S. Cl. ............ 424/404; 424/400; 424/402; 424/405; 424/409; 424/412; 424/413; 428/411.1; 428/457; 428/458; 428/480; 428/481

(58) Field of Search ............ 424/79, 400, 402, 424/404, 443, 409, 489, 412, 413, 421, 405; 427/396.2; 428/411.1, 457, 488, 480, 481

(56) References Cited

U.S. PATENT DOCUMENTS

| | | | |
|---|---|---|---|
| 4,258,103 | 3/1981 | Hosmer et al. | 428/342 |
| 4,284,444 | 8/1981 | Bernstein et al. | 156/60 |
| 4,390,580 | 6/1983 | Donovan | 428/68 |
| 4,775,585 | 10/1988 | Hagiwara et al. | 428/323 |
| 4,911,898 | 3/1990 | Hagiwara et al. | 423/118 |
| 4,911,899 | 3/1990 | Hagiwara et al. | 423/118 |
| 4,938,958 * | 7/1990 | Niira et al. | 424/79 |
| 5,009,898 | 4/1991 | Sakuma et al. | 424/618 |
| 5,019,096 * | 5/1991 | Fox, Jr. et al. | 623/1 |
| 5,100,671 | 3/1992 | Maeda et al. | 424/443 |
| 5,180,585 | 1/1993 | Jacobson et al. | 424/405 |
| 5,244,667 * | 9/1991 | Hagiwara et al. | 424/409 |
| 5,296,238 | 3/1994 | Sugiura et al. | 424/604 |
| 5,545,476 * | 8/1996 | O'Dell et al. | 428/327 |
| 5,556,699 | 9/1996 | Niira et al. | 428/323 |
| 5,647,858 | 7/1997 | Davidson | 604/264 |
| 5,681,575 | 10/1997 | Burrell et al. | 424/423 |
| 5,698,229 | 12/1997 | Ohsumi et al. | 424/604 |
| 5,709,870 | 1/1998 | Yoshimura et al. | 424/404 |

FOREIGN PATENT DOCUMENTS

| | | | |
|---|---|---|---|
| 39 23 555 A1 | 2/1990 | (DE) | B32B/27/04 |
| 3923555 | 2/1990 | (DE) | A47B/96/20 |
| 0 249 583 | 12/1987 | (EP) | D21H/5/00 |
| 1 300 319 | 12/1972 | (GB) | B32B/5/20 |
| 2 191 516 | 12/1987 | (GB) | E04C/2/18 |
| 2175101A2 | 7/1990 | (JP) | B27D/5/00 |
| 6-279218 | 10/1994 | (JP) . | |
| 06330285 | 11/1994 | (JP) . | |
| 08245301 | 9/1996 | (JP) . | |

* cited by examiner

*Primary Examiner*—Shelley A. Dodson
(74) *Attorney, Agent, or Firm*—Steven J. Hultquist; Edward K. Welch, II

(57) ABSTRACT

This invention provides an antimicrobial high-pressure laminate which contains an inorganic antibiotic metal containing composition incorporated in an antimicrobially effective amount in its surface layer, which is preferably formed of melamine. The laminate can be bonded to appropriate substrates to form antimicrobial table tops, cabinets, wall paneling, and counter tops.

33 Claims, 3 Drawing Sheets

ANTIBIOTIC HIGH-PRESSURE LAMINATES

FIELD OF THE INVENTION

This invention relates to high-pressure laminates exhibiting antimicrobial activity.

BACKGROUND OF THE INVENTION

High-pressure laminates offer hard wear resistant surfaces that provide a thin layer for preventing moisture penetration. Because of their abrasion and moisture resistant properties, high-pressure laminates are widely used for commercial, home, and industrial surfaces such as counter tops, table tops, and floor panels. See, e.g., U.S. Pat. No. 4,390,580 (Donovan), issued Jun. 28, 1993 and U.S. Pat. No. 5,545,476 (O'Dell) issued Aug. 13, 1996.

These laminates are multilayer structures formed of several paper, or woven or non-woven fabric, layers embedded in one or more polymer resins. Suitable resins include melamine resins, phenolic resins, urea resins, epoxy resins, acrylic resins, urethane resins, ABS resins, polycarbonate resins, and in particular melamine-formaldehyde and phenol-formaldehyde resins. The paper or fabric is saturated with resin slurry consisting of a fine dispersion of resin, ceramic reinforcement and sometimes color additives in a water base. Once the slurry is applied to the surface of the paper or fabric, it is allowed to dry in air or in a drying oven. Generally, the top layer is formed from decorative paper saturated with a melamine-based slurry and the lower layers are formed from brown craft paper saturated with a phenol-based resin. Once dry, the layers are stacked in a heated press that cures the polymers and bonds the layers together to form the laminate.

In use, high-pressure laminates often come in contact with food and are a breeding ground for bacteria, fungi, and other microorganisms. Therefore, attempts have been made to develop high-pressure laminates exhibiting antimicrobial action. For example, the organic compound triclosan has been incorporated in countertops in an attempt to provide a surface exhibiting long lasting antimicrobial properties. However, microorganisms can develop resistance to organic compounds such as tricolosan. Moreover, the antimicrobial effects of triclosan decline over time as triclosan leaches out from the surface of the substrate. In addition, triclosan is believed to cause skin irritation. Furthermore, triclosan is believed to generate dioxin when burned, creating disposal problems.

There is therefore a need for a high-pressure laminate containing an antimicrobial composition that does not generate antibiotic resistance. There is also a need for a high-pressure laminate containing an antimicrobial that is non-toxic and safe for human contact. In addition, there is a need for a high-pressure laminate containing an antimicrobial agent that does not generate toxins when disposed of.

SUMMARY OF THE INVENTION

This invention provides an antimicrobial high-pressure laminate, comprising: a) one or more sheets of paper saturated with one or more resins, and b) an inorganic antibiotic metal containing composition incorporated, or coated on, one or more of the resins. In a preferred embodiment, the high-pressure laminate comprises a melamine surface layer that has the inorganic antibiotic metal containing composition dispersed in it. The high-pressure laminates of this invention can be used for eating surfaces, cabinets, wall paneling, and many other applications.

DETAILED DESCRIPTION OF THE INVENTION

All patent applications, patents, patent publications, and literature references cited in this specification are hereby incorporated by reference in their entirety. In the case of inconsistencies, the present description, including definitions, is intended to control.

This invention provides an antimicrobial high-pressure laminate formed of: a) one or more sheets of paper or synthetic fiber saturated with one or more resins, and b) an antibiotic metal containing composition incorporated into one or more of the resins. In one embodiment, the resin is melamine. In another embodiment, the resins include both a melamine and phenolic resin. In the preferred embodiments described below, the inorganic antibiotic composition is an antimicrobial ceramic particle. It is also possible, however, to incorporate, e.g., a silver salt, as an antibiotic metal containing composition.

This invention also provides an antimicrobial high-pressure laminated substrate, formed of: a) a substrate; and b) a high-pressure laminate bonded to at least part of the surface of the substrate, wherein the high-pressure laminate contains an inorganic antibiotic metal containing composition.

According to the present invention, an inorganic antibiotic metal containing composition is incorporated in a high-pressure laminate to provide non-toxic antimicrobial action without the possibility, associated with organic compounds of the prior art, of development of antibiotic resistance or irritation. The use of a silver containing composition in particular allows an exceptionally safe, non-toxic and antimicrobially effective high-pressure laminate to be obtained.

Figure 1:
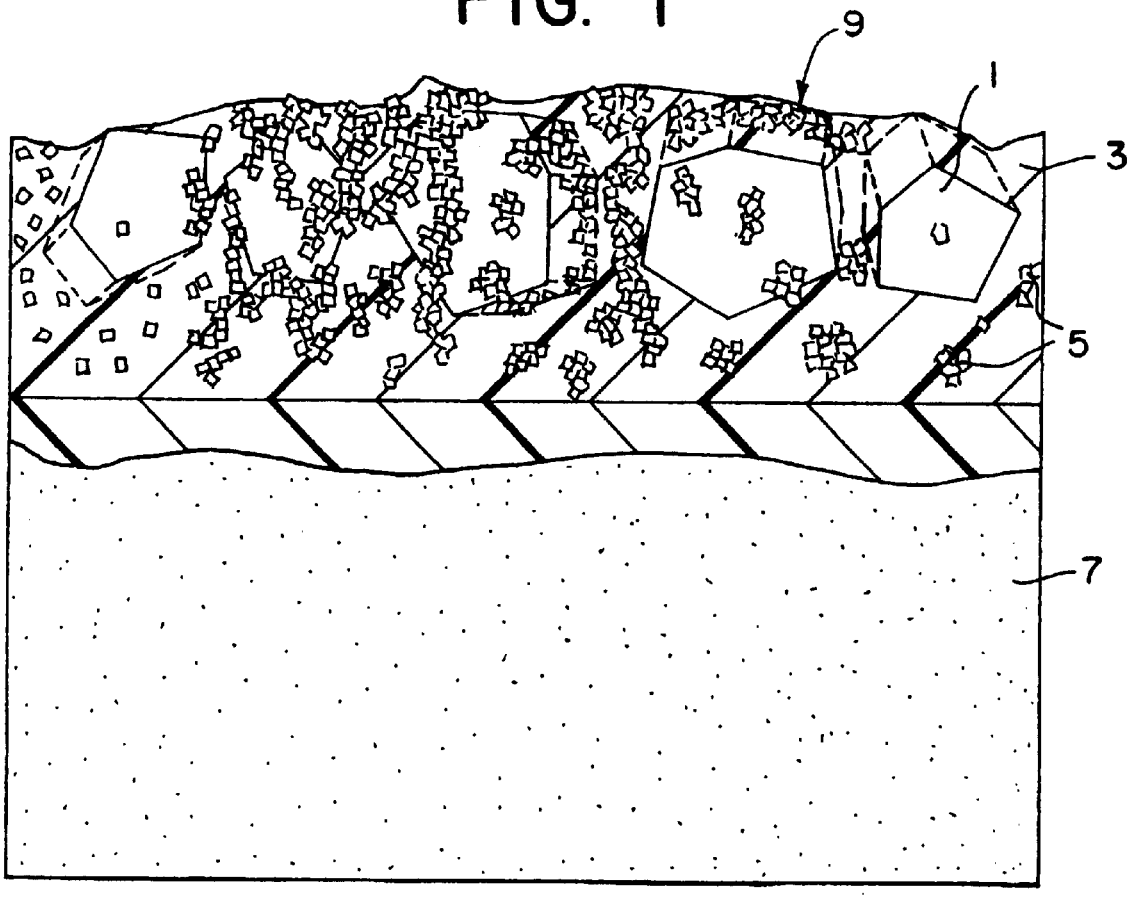
FIG. 1 shows an antimicrobial laminate of the subject invention in which antimicrobial ceramic particles are incorporated in a melamine layer.

In one embodiment of the present invention, the antimicrobial ceramic is dispersed in a layer of the laminate, preferably a top layer formed of melamine. An example of this embodiment is depicted in FIG. 1. The high-pressure laminate is formed of a melamine layer (3) forming the top surface the laminate (9). Conventional ceramic reinforcement particles employed in high-pressure laminate surfaces (1) and antimicrobial ceramic particles employed according to the invention (5) are incorporated into the melamine layer. Beneath the melamine layer are layers of phenolic resin (7). Layers of paper may be incorporated into the melamine layer, the phenolic layer, or both.

Figure 2:
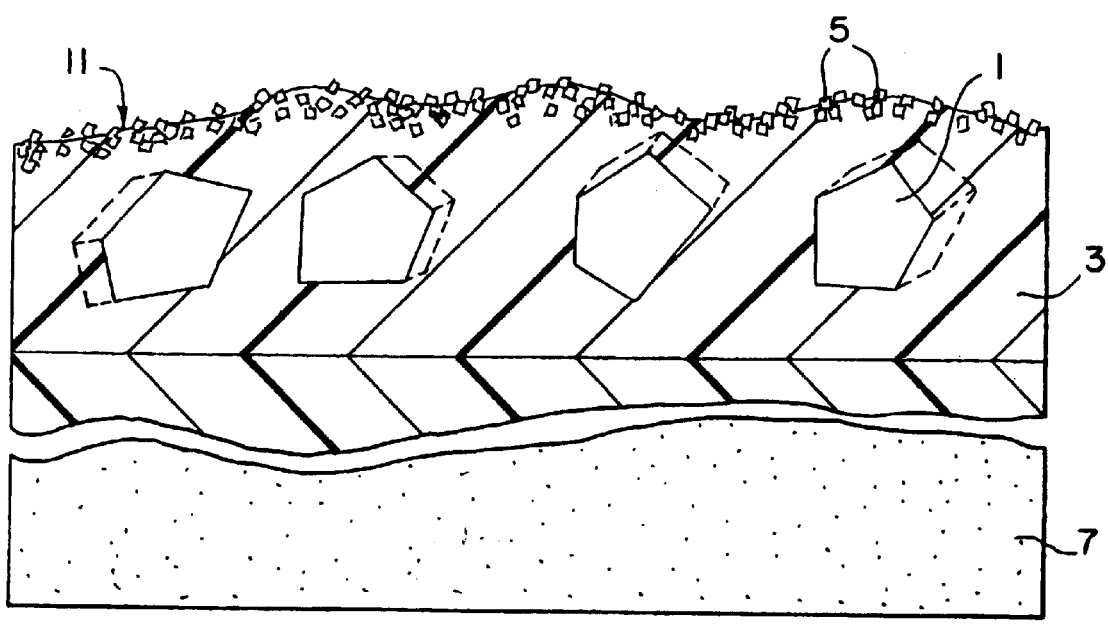
FIG. 2 shows an antimicrobial laminate of the subject invention in which antimicrobial ceramic particles are bonded to a surface of a melamine layer that has been softened to render it adherent.

In another embodiment, the antimicrobial ceramic is bonded to the top layer of the high-pressure laminate. For example, the high-pressure laminate substrate can be treated with a solvent or composition that is suitable to soften the surface of the laminate, such as a melamine surface, to render it adhesive. Suitable solvents include, but are not limited to, acetone xylene, toluene, hexane, dimethylactemide, and tetrahydrofuran. The composition used to soften the laminate can be sprayed onto the surface of the substrate. The antimicrobial ceramic can then be applied to the treated surface and bonded thereto. For example, as shown in FIG. 2, the antimicrobial ceramic particles (5) are embedded at the surface of a melamine layer (3) which has been substantially softened. The resulting product (11) has antimicrobial particles (5) concentrated at the surface.

Figure 3:
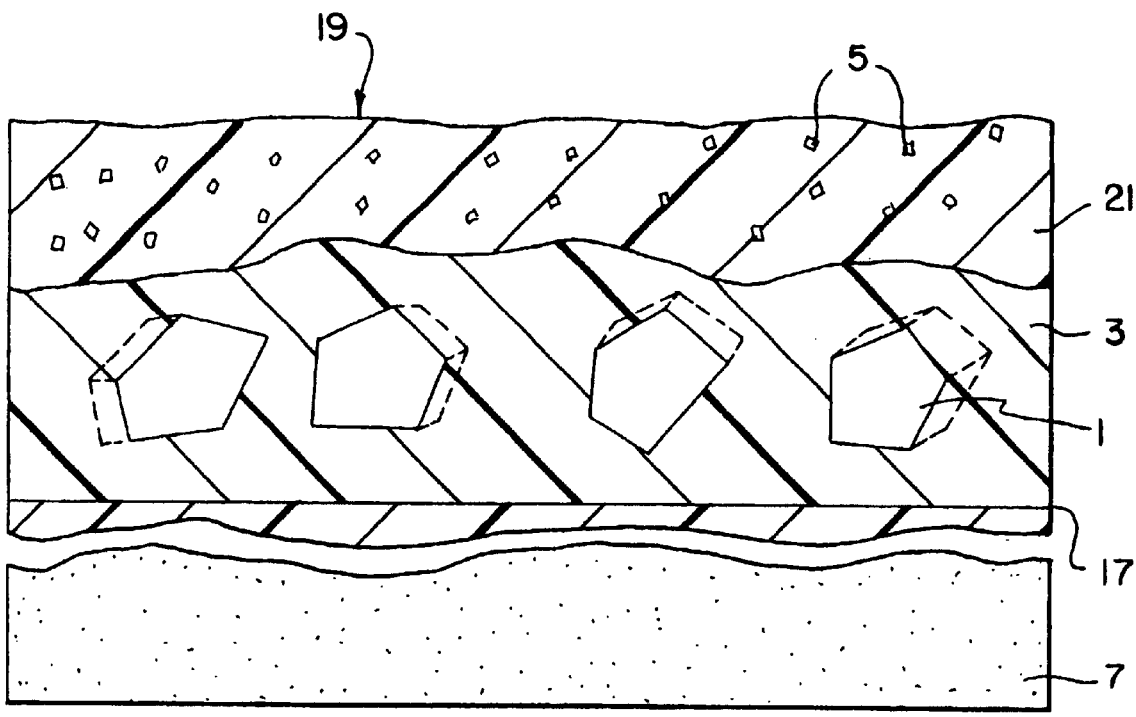
FIG. 3 shows an antimicrobial laminate of the subject invention in which antimicrobial zeolite particles are applied to the surface of a melamine layer, the particles being substantially uniformly dispersed in a coating composition.
Figure 4:
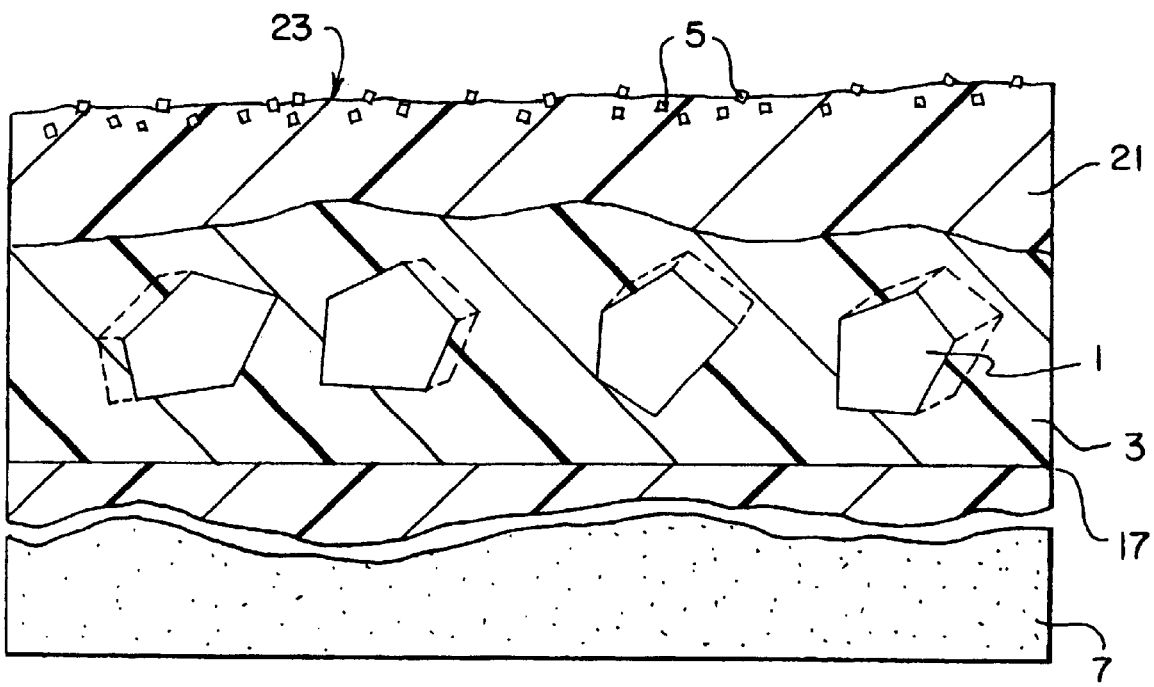
FIG. 4 shows an antimicrobial laminate of the invention in which antimicrobial ceramic particles have been applied to an adherent composition coated on top of the melamine surface of a high-pressure laminate.

In another embodiment of the invention, the antimicrobial ceramic is incorporated into a coating material that is bonded to the high-pressure laminate. For example, as shown in the laminate product (19) shown in FIG. 3, the antimicrobial particles (5) can be dispersed in an adhesive coating (21) which is applied to the high-pressure laminate (17). Alternately, as shown in FIG. 4, a product (23) exhibiting antimicrobial action at its surface is obtained by applying an adhesive layer (21) to a high-pressure laminate (17), and applying antimicrobial ceramic powder (5) to the adhesive.

Figure 5:
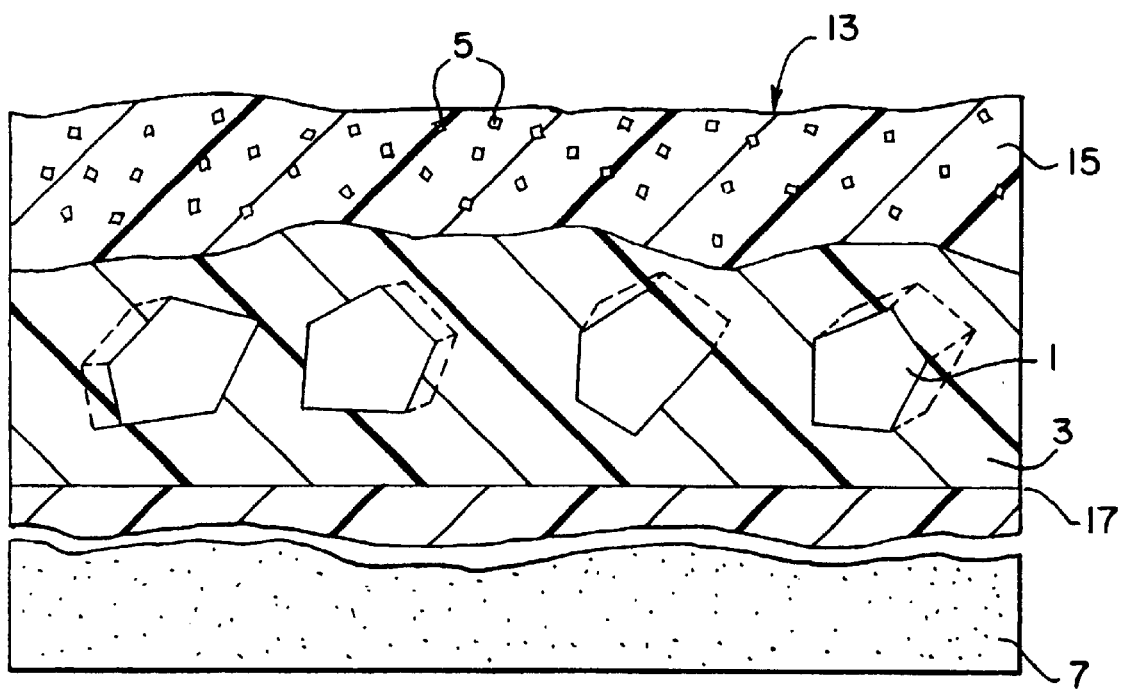
FIG. 5 shows an antimicrobial laminate of the invention in which antimicrobial ceramic particles have been incorporated in a polymeric layer that has been applied to a high-pressure laminate, such as by retrofitting.

It is also possible, according to the invention, to retrofit an existing high-pressure laminate by bonding a thin layer of polymeric material containing the antimicrobial ceramic to the surface of a high-pressure laminate. Suitable polymeric materials include, but are not limited to, melamine, PVC, polyurethane, polycarbonate, and other thermoplastics. For example, a thin layer of melamine containing the inorganic antimicrobial, with or without filler, pigment, paper, or fabric, can be bonded to an existing melamine surface using an adhesive, thereby rendering the surface of the product antimicrobial. The polymeric layer can be produced by methods similar to those used to produce the high-pressure laminate, however, using fewer and/or thinner sheets of paper or fabric. The thickness of the polymeric layer is preferably between 0.01 and 2 mm, more preferably between 0.05 and 1.5 mm, and most preferably between 0.1 and 1 mm. An example of a retrofitted high-pressure laminate (13) is shown in FIG. 5, which depicts a high-pressure laminate (17) to which a layer (15) containing antimicrobial particles (5) has ben retrofitted.

It has been determined by the inventors that adding antimicrobial zeolite, the preferred antimicrobial ceramic, to melamine slurry as a dry powder results in a poor quality laminate. Specifically, conventional mixing and application to paper causes aggregation of the zeolite powder with ceramic reinforcement filler and pigment in the laminate, resulting in poor cosmetic qualities. To prevent aggregation, it is preferred that the antimicrobial be predispersed in a water-based slurry (e.g. 20 wt. %), and then mixed into (e.g. via a high shear mixer) a melamine slurry.

For example, a suitable 20 wt. % aqueous slurry may be made using type A zeolite containing 0.6 wt. % silver, 14 wt. % zinc, 2.5 wt. % ammonium, comprised of particles that are 2.5 $\mu$m in diameter. Such a zeolite is manufactured under the designation "AW 10" by Shinegawa Fuel Co. Ltd. The laminates produced using the predispersed slurry show no evidence of particle aggregation.

To produce a typical high-pressure laminate of the invention, a top layer of paper or fabric is saturated in a melamine-based solution which contains melamine-formaldehyde, filer such as aluminum oxide, a coloring agent such as titanium dioxide, and conventional surfactants and emulsifiers to maintain the powders in suspension. The solution also contains the type A zeolite described above, which has been added in a 20 wt. % solids aqueous slurry. Once the solution has soaked into the paper or fabric, it is dried at 20 to 130° C., preferably 50 to 110° C., most preferably 80 to 100° C. Several other layers are prepared in a similar way using the same or different papers, and the same or different resin, but without antimicrobial zeolite. Preferably these layers are made using paper impregnated with phenolic resin and without filers or color additives. Such phenolic, or other, resin based layers are stacked with the melamine top layer and pressed at an elevated temperature. The pressure is preferably between 3 and 30 MPa. The temperature is generally between 50 and 500° C., preferably between 80 and 300° C., and most preferably between 100 and 250° C. The "hold time" is generally between 1 and 120 minutes, preferably between 5 and 90 minutes, and most preferably between 10 and 60 minutes. The number of melamine and phenolic layers stacked in the press determines the thickness of the laminate. The overall thickness is typically between 0.1 and 5 mm, and preferably between about 0.8 and 3 mm.

If desired, antimicrobial ceramic particles can be applied to the surface of the melamine after application of resin to the paper by applying a solution containing the ceramic particles to the laminate. The solution can, for example, be solvent (e.g. water) based, or a slurry of melamine containing the antimicrobial agent, i.e. the same resin used in the top layer of the laminate. In a preferred embodiment, the antimicrobial is sprayed on the laminate before it is pressed. This method is advantageous because it assures that the inorganic antimicrobial particles are concentrated at the surface of the laminate and little or no antimicrobial ceramic needs to be dispersed into the bulk of the polymer. When spraying on a solution of inorganic antimicrobial, the antimicrobial is present at between 0.01 and 90%, preferably between 0.1 and 60%, and more preferably between 0.5 and 30% of the total weight of the solids in the solution. Alternately, instead of spraying, paper that has been dipped in melamine resin can be dipped in a solution containing inorganic antimicrobial particles. The resulting laminate contains a concentration of inorganic antimicrobial in the outer coating of from 0.01 to 50%, more preferably from 2 to 12%.

Another possible topical application of the inorganic antimicrobial agent is performed by treating the surfaces of mold plates (i.e., plates used to mold the high-pressure laminate) with a solution containing an inorganic antimicrobial before pressing the resin-embedded sheets. The mold plates sandwich the melamine and phenolic layers at the top and bottom of the laminate, between press plates (i.e., plates used to apply pressure to the laminate). The solution contains a melamine slurry similar to that employed in the spray process describe above. The solution may also contain a solvent to promote fast drying.

In one embodiment of the invention, the inorganic antibiotic metal containing composition is an antibiotic metal salt. Such salts include silver acetate, silver benzoate, silver carbonate, silver iodate, silver iodide, silver lactate, silver laurate, silver nitrate, silver oxide, silver palmitate, and silver sulfadiazine. Silver nitrate is preferred. These salts are particularly quick acting, as no release from ceramic particles is necessary for the high-pressure laminate to function antimicrobially. In one embodiment of the invention, the antimicrobial inorganic salt concentration at the surface of the laminate is preferably from 2 ppb–40 ppm. Preferably, the concentration of the silver salt in the laminate is from 0.1–5% of the laminate.

Preferably, however, antibiotic ceramics are employed. These include zeolites, hydroxyapatite, zirconium phosphates or other ion-exchange ceramics. Hydroxyapatite particles containing antimicrobial metals are described, e.g., in U.S. Pat. No. 5,009,898. Zirconium phosphates containing antimicrobial metals are described, e.g., in U.S. Pat. Nos. 5,296,238; 5,441,717; and 5,405,644. Zeolites, however, are preferred.

The zeolite particles of the preferred embodiment preferably have a particle diameter size of between 0.1 and 100 $\mu$m, more preferably between about 0.2 $\mu$m and 10 $\mu$m, most preferably between about 0.5 $\mu$m and 5 $\mu$m.

Preferred antibiotic zeolites can be prepared by replacing all or part of the ion-exchangeable ions in zeolite with antibiotic metal ions, as described in U.S. Pat. Nos. 4,938,958 and 4,911,898.

Either natural zeolites or synthetic zeolites can be used to make the antibiotic zeolites used in the present invention. A "zeolite" is an aluminosilicate composed of either a partially or completely substituted ion-exchangeable metal (M) in the aluminosilicate, wherein the metal is represented by the formula $xM_{2/n}O.Al_2O_3.ySiO_2.zH_2O$, and wherein x is the number of molecules of the metal oxide, y is the number of molecules of the silicone dioxide, M is an ion-exchangeable metal, n is the atomic valence of M, and z is the number of molecules of water.

In an embodiment of the present invention, the partially or completely substituted ion-exchangeable M is selected from the group consisting of silver, copper, zinc, mercury, tin, lead, bismuth, cadmium, chromium, and mixtures thereof. In a preferred embodiment, M is silver. These antibiotic metal ions are believed to exert their effects by disrupting respiration and electron transport systems upon absorption into bacterial or fungal cells. Antimicrobial metal ions of silver, gold, copper and zinc, in particular, are considered safe for in vivo use. Antimicrobial silver ions are particularly useful for in vivo use due to the fact that they are not substantially absorbed into the body.

Because the microbiocidal metal of the present invention is stably held to the aluminosilicate matrix, the loss of metal is negligible and the antimicrobial effect is sustained over significantly longer periods of time than that obtained using organic microbial agents.

Examples of such zeolites include A-type zeolites, X-type zeolites, Y-type zeolites, T-type zeolites, high-silica zeolites, sodalite, mordenite, analcite, clinoptilolite, chabazite and erionite. The molar ratio of $SiO_2$ is preferably within the range of 1.4–40. Zeolite A has an $SiO_2$ to $Al_2O_3$ molar ratio of about 1.4–2.4. Zeolite X has an $SiO_2$ to $Al_2O_3$ molar ratio of about 2–3. Zeolite Y has an $SiO_2$ to $Al_2O_3$ molar ratio of about 3–6. The present invention is not restricted to these specific zeolites.

The ion-exchange capacities of these zeolites are as follows: A-type zeolite=7 meq/g; X-type zeolite=6.4 meq/g; Y-type zeolite=5 meq/g; T-type zeolite=3.4 meq/g; sodalite= 11.5 meq/g; mordenite=2.6 meq/g; analcite=5 meq/g; clinoptilolite=2.6 meq/g; chabazite=5 meq/g; and erionite= 3.8 meq/g. These ion-exchange capacities are sufficient for the zeolites to undergo ion-exchange with ammonium and antibiotic metal ions.

The specific surface area of preferred zeolite particles is preferably at least 150 m$^2$/g (anhydrous zeolite as standard)

and the $SiO_2/Al_2O_3$ mol ratio in the zeolite composition is preferably less than 14, more preferably less than 11.

The antibiotic metal ions used in the antibiotic zeolites should be retained on the zeolite particles through an ion-exchange reaction. Antibiotic metal ions which are adsorbed or attached without an ion-exchange reaction exhibit a decreased bactericidal effect and their antibiotic effect is not long-lasting.

In the ion-exchange process, the antibiotic metal ions tend to be converted into their oxides, hydroxides, basic salts etc. either in the micropores or on the surfaces of the zeolite and also tend to deposit there, particularly when the concentration of metal ions in the vicinity of the zeolite surface is high. Such deposition tends to adversely affect the bactericidal properties of ion-exchanged zeolite.

In an embodiment of the antibiotic zeolites used, a relatively low degree of ion exchange is employed to obtain superior bactericidal properties. In an embodiment of this, at least a portion of the zeolite particles retain metal ions having bactericidal properties at ion-exchangeable sites of the zeolite in an amount less than the ion-exchange saturation capacity of the zeolite. The zeolite employed in the present invention preferably retains antimicrobial metal ions in an amount up to 40% of the theoretical ion-exchange capacity of the zeolite. Such ion-exchanged zeolite with a relatively low degree of ion-exchange may be prepared by performing ion-exchange using a metal ion solution having a low concentration as compared with solutions conventionally used for ion exchange.

In antibiotic zeolite particles used in the present invention, ion-exchangeable ions present in zeolite, such as sodium ions, calcium ions, potassium ions and iron ions are preferably partially replaced with both ammonium and antibiotic metal ions. Such ions may co-exist in the antibiotic zeolite particle since they do not prevent the bactericidal effect.

The antibiotic metal ion is preferably present in the range of from about 0.1 to 15 wt. % of the zeolite. In one embodiment, the zeolite contains from 0.1 to 15 wt. % of silver ions and from 0.1 to 8 wt. % of copper or zinc ions. Although ammonium ion can be contained in the zeolite at a concentration of about 20 wt. % or less of the zeolite, it is desirable to limit the content of ammonium ions to from 0.5 to 15 wt. %, preferably 1.5 to 5 wt. %. Weight % described herein is determined for materials dried at conventional drying temperatures (110° C., 250° C., and 350° C.).

A preferred antibiotic zeolite for use in a high-pressure laminate formulation is type A zeolite containing either a combination of ion-exchanged silver, zinc, and ammonium or silver and ammonium. One such zeolite is manufactured by Shinegawa, Inc. under the product number AW-10N and consists of 0.6% by weight of silver ion-exchanged in Type A zeolite particles having a diameter of about 2.5$\mu$. Another formulation, AJ-10N, consists of about 2% by weight silver ion-exchanged in Type A zeolite particles having a diameter of about 2.5$\mu$. Another formulation, AW-80, contains 0.6% by weight of silver ion-exchanged in Type A zeolite particles having a diameter of about 1.0$\mu$. Another formulation, AJ-80N, consists of about 2% by weight of silver ion-excbanged in Type A zeolite particles having a diameter of about 1.0$\mu$. These zeolites preferably also contain about 0.5% by weight of ion-exchanged ammonium. The zeolites are often obtained in master batches of low density polyethylene, polypropylene, or polystyrene, containing 20 wt. % of the zeolite.

The antibiotic particles are preferably present in a concentration by weight in the laminate formulation of from about 0.01 to 20%, more preferably from about 0.5 to 10% by weight, and most preferably from about 1 to 8%. In one embodiment of the invention, the concentration of antibiotic particles by weight in the laminate is about 4%.

The preferred antimicrobial ceramic used in the present invention (i.e., antimicrobial zeolite) is effective against a broad range of microbes including bacteria and fungi. It is also believed that it is effective against algae.

By combining the superior surface properties of high-pressure laminates with the improved safety and efficacy of antimicrobial ceramics, this invention provides a new class of high-pressure laminate that is advantageous for use as a food surface, or any other surface that must be kept relatively free of microorganisms.

In one embodiment of the invention, the high-pressure laminate contains at least one layer of melamine. Alternately, the high-pressure laminate contains at least one layer of polyurethane, phenolic resin, epoxy resin, urethane resin, urea resin, or unsaturated polyester resin. U.S. Pat. No. 4,938,955 (Niira) issued Mar. 31, 1992 provides examples of these and other resins. Melamine-formaldehyde and phenol-formaldehyde are commonly used resins for manufacturing high-pressure laminates that are of particular use in the present invention.

The high-pressure laminate can include any additional conventional ingredients of high-pressure laminates, and can include a weathering agent, a metal ion stabilizer, an antioxidant, a brightener, a pigment, a flame retardant or a mixture of two or more of these ingredients. U.S. Pat. No. 5,244,677 (Hagiwara) issued Sep. 14, 1993 describes examples of such agents and their use in making formulations containing antibiotic zeolites.

If desired, discoloration inhibitors can be used in conjunction with antimicrobial ceramics in the high-pressure laminates. These include benzotriazole type compounds, oxalic acid anilide type compounds, salicylic acid type compounds, cyanoacrylate type compounds, benzophenone type compounds, hindered amine type compounds, hindered phenol type compounds, phosphorous type compounds, sulfur type compounds, and hydrazine type compounds. U.S. Pat. No. 5,556,699 (Niira et al.), issued Sep. 17, 1998 describes examples of such discoloration inhibitors and their uses. In a preferred embodiment, ammonium ions are incorporated in antimicrobial zeolites as discoloration inhibitors as described e.g. in U.S. Pat. No. 4,938,958 (Niira), issued Jul. 3, 1990.

The high-pressure laminate may be permanently or semi-permanently attached to an appropriate substrate. For example, an "underboard" can be treated with a conventional cement or epoxy adhesive using a trowel, or by using other conventional methods. The high-pressure laminate of the invention can then be applied directly to the surface, and pressure exerted until the laminate sets to the adhesive and dries. One skilled in the art will readily recognize other possible methods for attaching the high-pressure laminate of the invention to substrates. In a preferred embodiment, the surface of the substrate in contact with the laminate is a hard surface.

In one embodiment of the invention, the high-pressure laminated substrate is an eating surface. In another embodiment, the invention is a table top formed using the high-pressure laminate. In still another embodiment, the invention is a kitchen cabinet formed using the high-pressure laminate. In yet another embodiment, the invention is a wall paneling made using the high-pressure laminate. The invention also encompasses a counter top and a bookshelf made using the high-pressure laminate.

The present invention is explained in more detail with reference to the following non-limiting examples.

EXAMPLE 1

Production of a Melamine-Formaldehyde-Based High-pressure Laminate

A high-pressure laminate incorporating antibiotic zeolite particles was prepared as follows.

A 20% slurry of AW10 zeolite obtained from Shinegawa Fuel Co. was prepared. The slurry was mixed into a bath of conventional melamine to arrive at a 2.5 wt. % concentration of the zeolite. The melamine bath also included conventional ceramic reinforcement particles and pigments. The melamine mixture was then spread on kraft paper and allowed to dry. Phenolic resin conventionally employed in the underlayers of high-pressure laminates was spread on additional layers of paper and allowed to dry. The dried layers of melamine containing the antibiotic zeolite and phenolic resin (without any antibiotic particles) were pressed together in a conventional heating and pressing apparatus employed to make high-pressure laminates.

EXAMPLE 2

Testing of Antimicrobial High-pressure Laminate

Zone of inhibition tests were conducted on one inch square samples of the laminate formed from either the antimicrobial high-pressure laminate produced as described in Example 1, or a control (non-antimicrobial) laminate. Specifically, after incubation for 24 hours, both surfaces were tested for viable bacteria by measurement of zones of inhibition in millimeters (mm). Results shown below are averages of several tests.

| IN-VITRO MICROBIAL CHALLENGE TEST RESULTS (ZONE OF INHIBITION) LAMINATE SAMPLES | | |
| --- | --- | --- |
|  | E. coli | Salmonella typhimurium |
| Antimicrobial laminate | 4 | 4 |
| Control | 0 | 0 |

Tests were also conducted on the antimicrobial high-pressure laminate prepared as described in Example 1 and control laminated samples which involved direct inoculation into nutrient broth containing either E. coli or Salmonella typhimurium stock culture solutions. After incubation for 24 hours, the solutions were sampled for viable bacteria. Results are shown below as percentages killed of each bacterium.

| IN-VITRO MICROBIAL CHALLENGE TEST RESULTS (ZONE OF INHIBITION) - LAMINATE SAMPLES | | |
| --- | --- | --- |
|  | E. coli | Salmonella typhimuriim |
| Antimicrobial laminate | 100% | 100% |
| Control | 0% | 0% |

These tests demonstrate that the antimicrobial high-pressure laminate of the invention exhibits substantially higher antimicrobial activity than a laminate lacking an inorganic antimicrobial agent.

EXAMPLE 3

Safety and Biocompatibility Data

Safety and Biocompatibility tests were conducted on the antibiotic zeolites employed in the invention. ISO 10993-1 procedures were employed. The following results were obtained:

Cytotoxicity: Non-Toxic
Acute Systemic Toxicity: Non-Toxic
Intracutaneous Toxicity: Passed
Skin Irritation Test: Non-Irritant
Chronic Toxicity: No Observable Effect
In-vitro Hemolysis: Non-Hemolytic
30-day Muscle Implant Test: Passed
60-day Muscle Implant Test: Passed
90-day Muscle Implant Test: Passed
Ames Mutagenicity Test: Passed
Pyrogenicity: Non-Pyrogenic Thus, the antibiotic zeolites are exceptionally suitable under relevant toxicity and Biocompatibility standards for use in a high-pressure laminate.

While preferred embodiments of the invention have been described in the foregoing examples, it will be understood by those skilled in the art that various changes and modifications may be made therein without departing from the spirit and the scope of the invention. Accordingly, the above description should be construed as illustrating and not limiting the scope of the invention.

What is claimed is:

1. An antimicrobial high-pressure laminate, comprising:
   (a) multiple layers of paper or cloth saturated with a resin component comprising a melamine resin; and
   (b) an inorganic antibiotic metal ion component distributed in a surface of the resin component such that the inorganic antibiotic metal ion is exteriorly available in an antimicrobially effective amount.

2. The antimicrobial high-pressure laminate of claim 1 wherein the inorganic antibiotic metal ion component comprises a silver salt component.

3. The antimicrobial high-pressure laminate of claim 2 wherein the silver salt component comprises a silver salt selected from the group consisting of silver acetate, silver benzoate, silver carbonate, silver iodate, silver iodide, silver lactate, silver laurate, silver nitrate, silver oxide, silver palmitate, and silver sulfadiazine.

4. The antimicrobial high-pressure laminate of claim 2 wherein the silver salt component comprises silver nitrate.

5. The antimicrobial high-pressure laminate of claim 2 wherein the laminate has a thickness of at least 0.01 mm.

6. The antimicrobial high-pressure laminate of claim 1 wherein the melamine resin does not incorporate a chlorohexidine component.

7. An antimicrobial high-pressure laminate having a thickness of at least 0.1 mm, comprising:
   (a) multiple layers of paper or cloth saturated with a resin component; and
   (b) inorganic ceramic particles with antibiotic metal cations ion-exchanged thereon, wherein the particles are distributed in a surface of the laminate, such that an ion-exchange reaction in the ceramic particles releases antibiotic metal cations, which can migrate out of the ceramic particles to become exteriorly available in an antimicrobially effective amount.

8. An antimicrobial high-pressure laminate having a thickness of at least 0.1 mm, comprising:
   (a) multiple layers of paper or cloth saturated with a resin; and
   (b) inorganic ceramic particles with antibiotic metal cations ion-exchanged thereon, wherein the particles are distributed in a surface of the laminate, such that some or all of the ceramic particles are exteriorly exposed to release antibiotic metal cations in an antimicrobially effective amount.

9. An antimicrobial high-pressure laminate:
   (a) having a thickness of at least 0.1 mm;
   (b) comprising a multiple layers of paper or cloth saturated with one or more resins and pressed together to form the laminate;
   (c) comprising inorganic ceramic particles:
      (i) with antibiotic metal cations ion-exchanged thereon;
      (ii) distributed in or on a surface layer of the high pressure laminate;
      (iii) retaining a matrix structure that permits, in the presence of water and cations, an ion exchange reaction to release antibiotic metal cations from the laminate in an antimicrobially effective amount.

10. The antimicrobial high-pressure laminate of claim 7 having a thickness of at least 0.8 mm.

11. The antimicrobial high-pressure laminate of claim 7 wherein the particles are evenly distributed.

12. The antimicrobial high-pressure laminate of claim 7 wherein the ceramic particles are bonded to a surface layer of the laminate.

13. The antimicrobial high-pressure laminate of claim 7 wherein the resin comprises a layer of melamine.

14. The antimicrobial high-pressure laminate of claim 7 wherein the resin comprises a layer of polyurethane.

15. The antimicrobial high-pressure laminate of claim 7 wherein the ceramic particles comprises silver ions ion-exchanged thereon as an antibiotic metal cation.

16. The antimicrobial high-pressure laminate of claim 7 wherein the ceramic particles comprise ion-exchanged hydroxyapatite or zirconium phosphate.

17. The antimicrobial high-pressure laminate of claim 7 wherein the ceramic particles comprise ion-exchanged zeolite.

18. The antimicrobial high-pressure laminate of claim 7 wherein the ceramic particles comprise aluminosilicate particles.

19. The antimicrobial high-pressure laminate of claim 18 wherein the aluminosilicate has a formula:

$$xM_{2/n}O.Al_2O_3.ySiO_2.zH_2O$$

wherein:
M is a partially or completely substituted ion-exchangeable metal;
n is the atomic valence of M;
x is the number of molecules of the metal oxide;
y is the number of molecules of the silicone dioxide; and
z is the number of molecules of water.

20. The antimicrobial high-pressure laminate of claim 19, wherein M is selected from the group consisting of silver, copper, zinc, mercury, tin, lead, bismuth, cadmium, chromium, and mixtures thereof.

21. The antimicrobial high-pressure laminate of claim 19, wherein M is silver.

22. The antimicrobial high-pressure laminated substrate of claim 7 further comprising a discoloration inhibitor.

23. The antimicrobial high-pressure laminated substrate of claim 22 wherein the discoloration inhibitor is inorganic.

24. The antimicrobial high-pressure laminated substrate of claim 23, wherein the discoloration inhibitor comprises one or more ammonium ions.

25. A counter top coated with the antimicrobial high-pressure laminate of claim 1.

26. A table having a top surface thereof coated with the antimicrobial high-pressure laminate of claim 1.

27. A cabinet having a surface thereof coated with the antimicrobial high-pressure laminate of claim 1.

28. Wall paneling having a surface thereof coated with with the antimicrobial high-pressure laminate of claim 1.

29. An antimicrobial high-pressure laminate formed by a process comprising:
  (a) providing a multi-layered substrate saturated with one or more resins;
  (b) applying a solvent to a surface of the laminate to soften the one or more resins; and
  (c) pressing inorganic antibiotic particles ceramic particles having silver ion exchanged thereon into the surface such that the silver is available in an antimicrobially effective amount.

30. An antimicrobial high-pressure laminate formed by a process comprising:
  (a) predispersing in a water-based slurry inorganic antibiotic ceramic particles having an antibiotic metal ion exchanged thereon;
  (b) mixing the water-based slurry into a resin to provide an even distribution of the ceramic particles in the resin; and
  (c) applying the mixture of (b) to a substrate to provide a surface such that the metal ion is available in an antimicrobially effective amount.

31. An antimicrobial high-pressure laminate having a thickness of at least 0.1 mm and comprising:
  (a) a laminate substrate;
  (b) a resin saturating the laminate substrate, and
  (c) zeolite particles comprising an antibiotic metal cation ion-exchanged thereon, said particles retaining a matrix structure that permits, in the presence of water and cations, an ion exchange reaction to release antibiotic metal cations from the laminate in an antimicrobially effective amount.

32. The antimicrobial high-pressure laminate of claim 8 wherein the ceramic particles comprise ion-exchanged hydroxyapatite or zirconium phosphate.

33. The antimicrobial high-pressure laminate of claim 9 wherein the ceramic particles comprise ion-exchanged hydroxyapatite or zirconium phosphate.

* * * * *